United States Patent
Keller et al.

(10) Patent No.: US 6,220,601 B1
(45) Date of Patent: Apr. 24, 2001

(54) MECHANICAL FACE SEAL DEVICE

(75) Inventors: Thomas Keller, Geretsried; Ulrich Reinfrank, Edling; Wolfgang Ries, Eschenlohe; Reinhard Svejkovsky, Geretsried; Robert Woppowa, Wolfratshausen; Dieter Ziegenbein, Geretsried, all of (DE)

(73) Assignee: Feodor Burgmann Dichtungswerke GmbH & Co., Wolfratshausen (DE)

( * ) Notice: Subject to any disclaimer, the term of this patent is extended or adjusted under 35 U.S.C. 154(b) by 0 days.

(21) Appl. No.: 09/490,076

(22) Filed: Jan. 24, 2000

Related U.S. Application Data

(63) Continuation of application No. PCT/EP98/04902, filed on Aug. 6, 1998.

(30) Foreign Application Priority Data

Mar. 20, 1998 (DE) .......................................... 298 05 089 U

(51) Int. Cl.$^7$ ..................................................... F16J 15/36
(52) U.S. Cl. ........................ 277/381; 277/391; 277/392; 277/393
(58) Field of Search .................................. 277/379, 380, 277/381, 383, 385, 391, 393, 392

(56) References Cited

U.S. PATENT DOCUMENTS

| | | | | |
|---|---|---|---|---|
| 2,463,695 | * | 3/1949 | Jensen ................................. | 277/392 |
| 2,467,239 | | 4/1949 | Snyder . | |
| 3,020,052 | | 2/1962 | Gits . | |
| 3,117,793 | * | 1/1964 | Hauser et al. . | |
| 3,887,200 | * | 6/1975 | Engelking et al. ................... | 277/385 |
| 3,969,451 | | 7/1976 | Floyd et al. . | |
| 4,342,538 | * | 8/1982 | Wolford et al. ....................... | 415/231 |
| 4,406,462 | * | 9/1983 | Witten ................................... | 277/348 |
| 4,491,331 | * | 1/1985 | Salant et al. ........................... | 277/379 |
| 4,558,872 | * | 12/1985 | Kossieck et al. ...................... | 277/379 |
| 5,375,852 | * | 12/1994 | Charhut ................................. | 277/371 |
| 5,725,219 | * | 3/1998 | Gilbert ................................... | 277/377 |

FOREIGN PATENT DOCUMENTS

| | | | |
|---|---|---|---|
| 3436799 | * | 7/1985 | (DE) . |
| 34 12 594 A1 | | 11/1985 | (DE) . |
| 1 121 160 | | 7/1956 | (FR) . |
| 8 09 458 | | 2/1959 | (GB) . |
| 2 019 956 | | 11/1979 | (GB) . |

\* cited by examiner

Primary Examiner—Anthony Knight
Assistant Examiner—Alison K. Pickard
(74) Attorney, Agent, or Firm—Birch, Stewart, Kolasch & Birch, LLP

(57) ABSTRACT

A mechanical face seal device includes a bellows assembly comprising a bellows member of resilient material having axially spaced mounting portions interconnected by an intermediate foldable portion, one of said mounting portions being adapted to be fixed relative to a rotary component whilst the other is in torque transferring relationship with a rotary annular seal member, and a biasing means for diasing the rotary annular seal member against the stationary annular seal member. An essentially stiff support member having a predetermined radial dimension is provided for axially supporting the rotary annular seal member and is itself supported by the bellows member. The bellows assembly further comprises a driving housing having axially spaced force transferring portions, of which one is in force transferring relationship with the mounting portion of the bellows member at the annular seal member side, whilst the other one is in force transferring relationship with the mounting portion at the rotary component side thereof, wherein the force transferring portion facing the mounting portion at the component side has an internal radial dimension which is less than the external radial dimension of the support member and greater than external radial dimension of the rotary annular seal member.

9 Claims, 1 Drawing Sheet

MECHANICAL FACE SEAL DEVICE

This application is a continuation of international application number PCT EP98/04902, filed Aug. 6, 1998 (status, abandoned, pending, etc.)

BACKGROUND OF THE INVENTION

1. Field of the invention

The invention relates to a mechanical face seal device, and especially to such a device having a bellows member of resilient material for establishing an axially resilient connection between one annular seal member of a pair of co-operating annular seal members and a rotary component.

2. Description of the Prior Art

In a bellows assembly such as are known e.g. from DE-A-34 12 594, and pages 22–23 of the Burgmann Lexikon, ABC der Gleitringdichtung, 1988, published by the author, a bellows member acts as a secondary dynamic seal thus making the construction of the mechanical face seal device less complicated and consequently more economical. Such mechanical face seal devices are unaffected by the effects of dirt and aging. A stiff support member may abut a face of a large rotary annular seal member for preventing the bellows member from penetrating a boring of the rotary annular seal member under axial forces acting thereon during operation. It is further known from U.S. Pat. No. 3 020 052 that a bellows assembly of a mechanical face seal device having a similar large rotary annular seal member may comprise a driving housing connected with a bellows member.

SUMMARY OF THE INVENTION

An object of the invention is to provide a improved mechanical face seal device of the type referred to above. A further object of the invention is to provide such a mechanical face seal device having minimized dimensions, especially its radial dimensions. Another object is to provide such a mechanical face seal device which has uncomplicated, highly reliable annular seal members suitable for economical mass production.

The mechanical face seal device in accordance with the invention includes a pair of co-operating annular seal members, of which one is adapted to be mounted in a non-rotational relationship on a stationary component whilst the other is provided for common rotation with a rotary component. A bellows assembly comprises a bellows member of resilient material having axially spaced mounting portions interconnected with each other by an intermediate foldable portion. One of said mounting portions can be fixed relative to the rotary component whilst the other is in torque transferring relationship with the rotary annular seal member. A biasing means serves for mechanically urging the rotary annular seal member against the stationary annular seal member. The mechanical face seal device of the invention further has an essentially stiff support member having a predetermined radial dimension for axially supporting the rotary annular seal member. By providing a stiff support member on which the rotary annular seal member can abut when in use, the annular seal member is prevented from coming into destructive or damaging engagement with the bellows member of resilient material due to axial forces effective on the mechanical face seal device, even though the radial dimension of the annular seal member may be minimal. The annular seal member is also prevented, in particular, from penetrating a boring in a driving housing which comprises axially spaced force transferring portions, of which one is in force transferring relationship with the mounting portion of the bellows member at the annular seal member side, whilst the other one is in force transferring relationship with the mounting portion at the rotary component side, whereby the force transferring portion facing the mounting portion at the rotary component side may have an internal radial dimension which is smaller than the predetermined external radial dimension of the support member. As a result of these measures no particular demands are made in regard to the configuration of the annular seal member so that not only may it have minimum radial dimensions but it can also be of simple cross-sectional shape so as to facilitate manufacture. Other advantageous embodiments of the invention and the effects and advantages deriving thereof will become apparent from the claims and the subsequent explanation.

BRIEF DESCRIPTION OF THE DRAWINGS

The above and other objects, features and advantages of the present invention will be more apparent from the following description with reference to the accompanying drawings in which.

DESCRIPTION OF A PREFERRED EMBODIMENT

Figure 1:
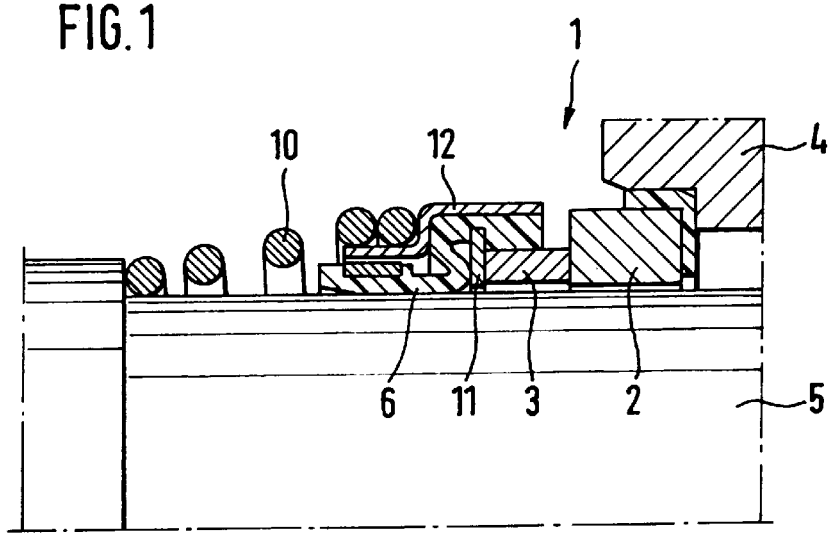
FIG. 1 is an overall fragmentary view in longitudinal section of a mechanical face seal device in accordance with the invention in the assembled state.

In FIG. 1 the mechanical face seal device of the invention bears the general reference number 1 and comprises a pair of co-operating annular seal members 2, 3, of which the annular seat member 2 is supported in a non-rotational relationship in suitable manner on a stationary component e.g. the housing 4 of a pump or the like. By contrast, the other annular seal member 3 is provided for rotating jointly with a rotary component e.g. a shaft 5 that is to be sealed with respect to the housing 4 by means of the mechanical face seal device. The annular seal members 2, 3 have radial, or approximately radial sealing faces between which a clearance-gap is formed when in use. For suitable materials for the annular seal members 2, 3 see e.g. to Burgmann Lexicon loc. cit., page 269. For further details reference can be made thereto.

Figure 2:
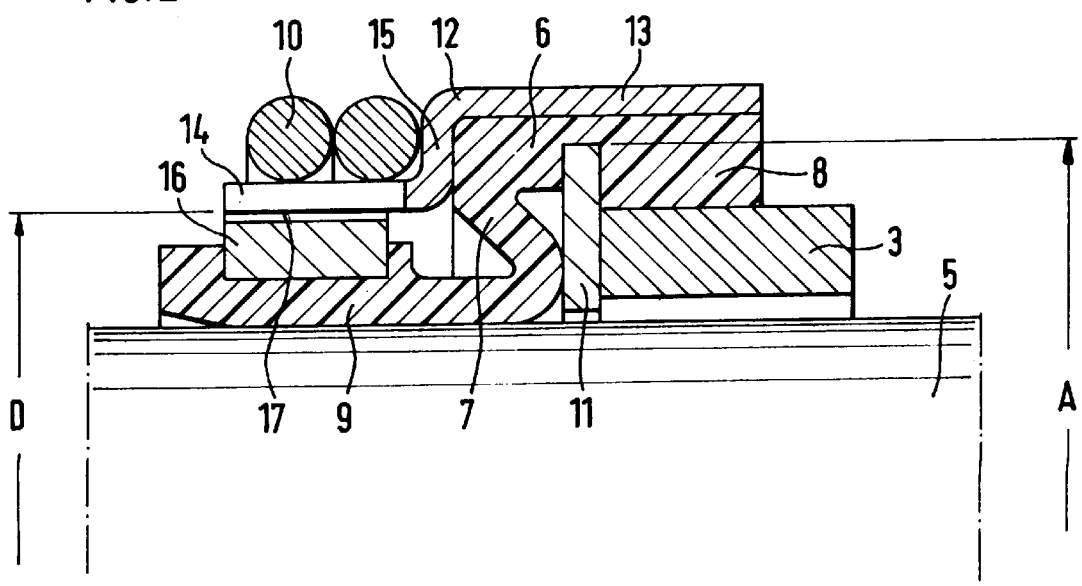
FIG. 2 is detailed view on enlarged scale in longitudinal section of the rotary part of the mechanical face seal device shown in FIG. 1.

Reference will be made hereinafter to FIG. 2 which shows the rotary part of the mechanical face seal device on a n enlarged scale. The rotary part comprises a bellows assembly including a bellows member 6 of resilient material such as rubber or an elastomer, in which, in a manner known per se, three portions can be de fined, namely, a first mounting portion 8, a second mounting portion 9 axially spaced from the first mounting portion, and a foldable intermediate portion 7 interconnecting the two mounting portions 8, 9. In use, the foldable intermediate portion 7 may have a Z-shaped configuration as shown in FIG. 2. However, the invention is not limited to such a configuration of the foldable portion 7. Other configurations can be found in e.g. Burgmann Lexicon loc. cit., page 23. The mounting portions 8, 9 preferably have a substantially tubular structure.

Furthermore, the bellows assembly comprises a driving means in the form of a driving housing 12 having a first force transferring portion 13 and a second force transferring portion 14 of reduced diameter, said two force transferring portions being interconnected by an intermediate shoulder or stepped portion 15. The first force transferring portion 13 is designed for accommodating the first mounting portion 8 of the bellows member 6 in such a manner that, when the annular seal member 3, the mounting portion 8 and the force transferring portion 13 are in co-axially overlapping relationship as shown in FIG. 2, the mounting portion 8 of the bellows member 6 will be enclosed by and compressed in sandwich-like manner between the outer peripheral surface of the annular seal member 3 and the inner peripheral surface of the force transferring portion 13 thus producing a frictional connection between said components. Torque can thus be transferred substantially free of slippage from the force transferring portion 13 through the mounting portion 8 to the annular seal member 3. If desired, rather than a frictional connection, a rigid connection could be provided between said components, e.g. by using an adhesive or the like.

The second force transferring portion 14 of the driving housing 12 defines a boring or through-opening having an internal radial dimension D. The second force transferring portion 14 can comprise a plurality of peripherally distributed, axially extending fingers that engage in axial grooves 17 provided in a driving ring 16 of suitable material such as metal. The driving ring 16 is preferably fixed on the second mounting portion 9 of the bellows member 6 by friction, or such fixation may be achieved during assembly by placing the bellows member 6 on the shaft 5 together with a driving ring 16 undersized. Rotation of the shaft 5 will thus be transferred through the mounting portion 9 and the driving ring 16 to the driving housing 12, and then from there to the annular seal member 3 in the manner described above.

A biasing means is provided for mechanically biasing the annular seal member 3 against the stationary annular seal member 2. Although other biasing means could be provided, the one used in the present embodiment of the invention preferably comprises a spiral or helical spring 10 which is supported at one end on a shoulder of the shaft, see FIG. 1, and is supported at the other end on the shoulder portion 15 of the driving housing 12. The spiral spring 10 preferably comprises a few closely adjacent turns which surround the second force transferring portion 14 of the driving housing 12 and counteract any possible spreading of the fingers of the force transferring portion 14. Furthermore, the spiral spring 10 preferably has a conical construction as shown in FIG. 1.

In accordance with the invention, a support member 11 is provided for axially supporting the annular seal member 3, said support member itself being held in suitable manner by the bellows member 6. The support member 11 may be an annular disc of a suitable material such as metal and is sufficiently stiff such that, in contrast to the bellows member 6, it will not, or only to a substantially lesser extent, yield to axially effective forces by becoming deformed. Instead of metal, the support member 1 could consist of a dimensionally stable plastics material such as PEEK or the like.

The support member 11 at its outer periphery is held in a groove in the first mounting portion 8 of the bellows member 6 near the foldable portion 7 either frictionally or by means of an adhesive, and it includes a boring through which the shaft 5 is passed. Furthermore, the support member 11 has a predetermined external radial dimension A which is greater, by a suitable amount, than the inner radial dimension D of the boring in the second force transferring portion 14 of the driving housing 12. One end of the annular seal member 3 may rest on the axially adjacent end face of the support member 11, whilst a section of the foldable portion 7 of the bellows member 6 can abut the opposite end face of the support member 6 when the device is in use and operational.

The result stemming from the construction of the mechanical face seal device as described hereinabove is that an axial force which is applied by the mechanical biasing means 10 or by hydraulic pressures effective during operation and which could cause axial movement of the driving housing 12 and the bellows member 6 relative to the annular seal member 3, cannot lead to the rotary annular seal member 3 penetrating into the boring of dimension D in the driving housing 12 and thereby causing extensive destruction or damage to the bellows member 6, the annular seal member 3 being substantially inhibited from effecting such an axial movement due to its co-operation with the stationary annular seal member 2. Excessive hydraulic or mechanical axial forces effective on the mechanical face seal device can only result in the support member 11 being moved into a position near the shoulder portion 15 of the driving housing 12 where it then comes to a halt so that the bellows member 6 will not be subjected to any damaging effects.

The invention permits the radial dimension of the annular seal member 3 to be minimized so that e.g. its outer radial dimension can be made smaller than the dimension D of the driving housing 12.

It will be understood that the foregoing description is merely illustrative of a preferred embodiment of the invention and that modifications and variations may be effected without departing from the spirit and scope of the novel concepts of the invention.

What is claimed is:

1. A mechanical face seal device including a pair of co-operating annular seal members which are movable relatively to each other in an axial direction, one of said annular seal members being stationary and adapted for mounting in a non-rotational relationship on a stationary component, whilst the other annular seal member being rotary for common rotation with a rotary component, a biasing means for applying a biasing force between the rotary annular seal member and the stationary annular seal member, and a bellows assembly comprising a bellows member of resilient material having axially spaced mounting portions interconnected with each other through an intermediate foldable portion, one of said mounting portions being adapted for mounting on the rotary component whilst the other mounting portion being mounted in torque transferring relationship to said rotary annular seal member, and an essentially stiff support member disposed between said foldable portion of the bellows member and said rotary annular seal member, said bellows assembly further comprising a driving housing means having a pair of axially spaced force transferring portions one of said force transferring portions being mounted in force transferring relationship to said one of said mounting portions for transferring a driving force to said bellows member, and the other force transferring portion being mounted in force transferring relationship to said other mounting portion of said bellows member, wherein said one of said force transferring portions has a radial inner dimension which is less than a maximum radial outer dimension of said support member and greater than a maximum radial outer dimension of said rotary annular seal member.

2. A mechanical face seal device as claimed in claim 1, wherein said biasing means is supported at one of the axial ends thereof by said driving means.

3. A mechanical face seal device as claimed in claims 1, wherein said biasing means comprises a tapering spiral spring.

4. A mechanical face seal device as claimed in claim 1, wherein said one of the mounting portions of the bellows member and said one of the force transferring portions of said driving housing means are connected with each other in a non-rotational manner whilst being moveable relatively to each other in an axial direction.

5. A mechanical face seal device as claimed in claim 1, wherein said support member is provided at a position between the axial ends of said other mounting portion of the bellows member close to the foldable portion thereof.

6. A mechanical face seal device as claimed in claim 1, wherein said support member comprises an annular disc.

7. A mechanical face seal device as claimed in claim 1, wherein said support member is made of metallic material.

8. A mechanical face seal device as claimed in claim 1, wherein said support member is made of a plastics material having greater stiffness than that of the bellows member.

9. A mechanical face seal device as claimed in claim 1, wherein said support member is held by said bellows member.

\* \* \* \* \*